United States Patent Office 3,203,102
Patented Aug. 31, 1965

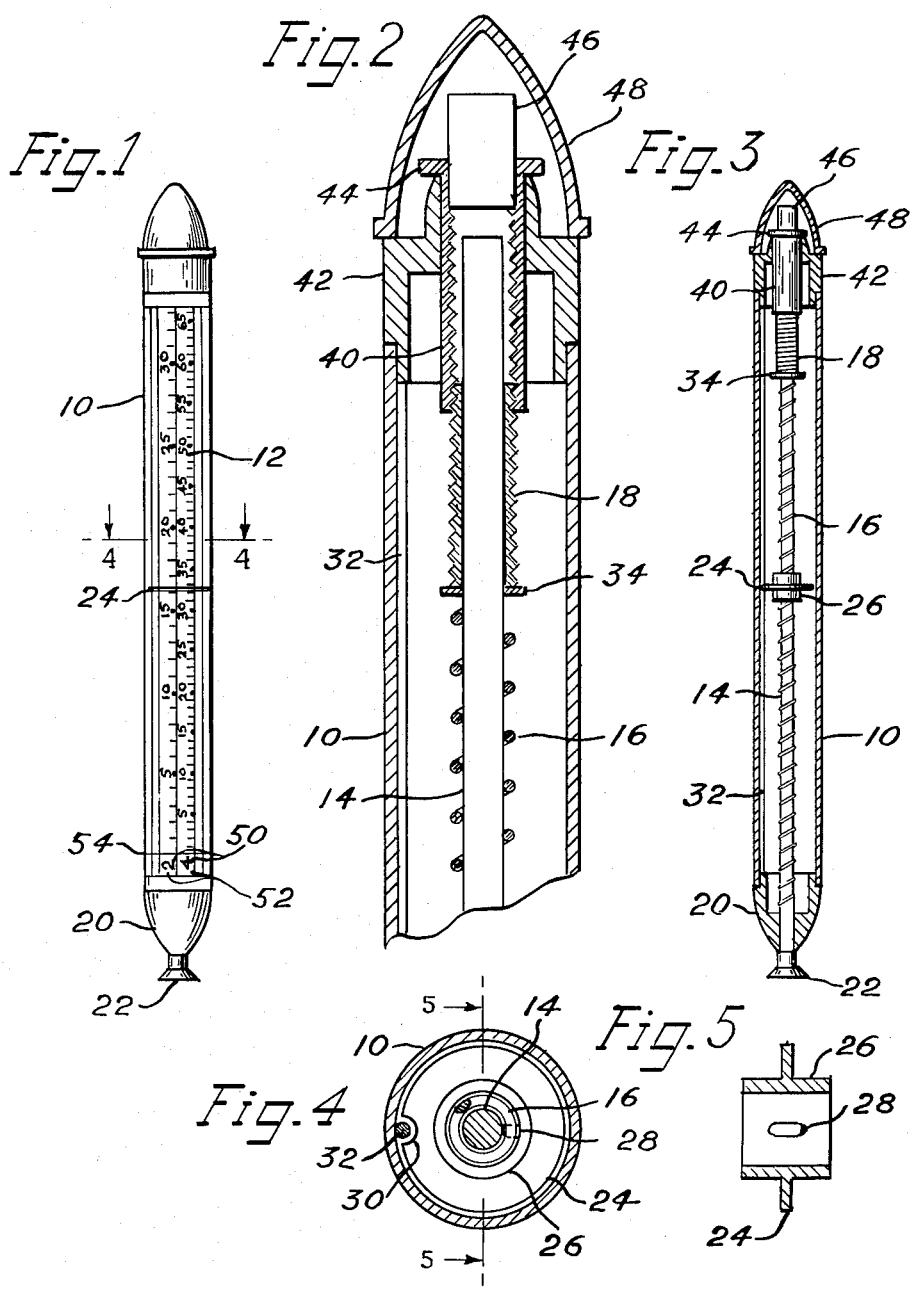

3,203,102
ROLLING CONTACT MEASURING INSTRUMENT WITH ADJUSTABLE SCALE
Louis J. Petion, 36 Barstow Road, Great Neck, N.Y.
Filed Apr. 13, 1964, Ser. No. 359,027
3 Claims. (Cl. 33—141)

This invention relates to improvements in measuring instruments, and more particularly to a measuring instrument for measuring straight and curved lines on maps and charts.

An important object of the invention is to provide a measuring instrument which indicates the measured distance in miles without the need of calculation.

A further object of the invention is to provide a measuring instrument with a selection of scales longitudinally delineated on a translucent outer casing.

Another object of the invention is to provide a convenient marking device, such as a crayon, for marking the route on the map or chart.

More specifically the object of the invention is to provide a measuring instrument wherein a rotating traction member is drivingly connected with an indicator movable along a compressible spring mounted on a shaft.

The main object of the invention is to provide a measuring instrument which has a convenient control member whereby the spring can be compressed and thereby the movement of the indicator adjusted to the scale of the map or chart.

A further object of the invention is to provide a novel and improved measuring instrument which is accurate, simple and durable in construction, inexpensive to manufacture, compact in size, neat in appearance, and which can be operated with a minimum amount of instructions.

Further objects and advantages of the invention will become apparent from the following description and claims and from the accompanying drawings, wherein:

FIGURE 1 is a view in side elevation of an improved measuring instrument constructed in accordance with the present invention;

FIGURE 2 is an enlarged partial longitudinal sectional view particularly illustrating the mechanism for compressing the spring;

FIGURE 3 is a longitudinal sectional view taken substantially through the center of FIGURE 1;

FIGURE 4 is an enlarged cross section through the measuring instrument taken on the line 4—4;

FIGURE 5 is a cross sectional view taken substantially along the line 5—5 in FIGURE 4 showing the lug on the inside of the indicator.

Referring to the drawings in detail, wherein for the purpose of illustration there is disclosed a preferred embodiment of the present invention, the numeral 10 represents a housing which in the form of a translucent tube has a number of scales 12 delineated thereon.

A shaft 14 with a compression spring 16 loosely mounted thereon is centered inside of said housing 10 and is rotatably held in that position at one end of said housing by a sleeve 18 and at the other end by a front cap 20, said front cap having an opening through which said shaft 14 projects. A wheel 22 which is used to roll over the surface to be measured is secured to the projecting end of said shaft 14.

An indicator 24 shaped like a disc with its periphery coated with a material such as a light paint, which is clearly visible through the translucent housing 10 is provided with a hub 26. A lug 28 which projects from the inside wall of said hub is shaped so that it engages the space between the coils of the spring 16 when said spring is either in its open or compressed position. A notch 30 in the outer edge of said indicator 24 engages the rod 32 which extends longitudinally along the inside of said housing 10 and whereby said indicator 24 is prevented from rotating with the shaft 14 as is clearly shown in FIGURE 4.

The sleeve 18 is provided with a flange 34 which impels against the end coil of the spring 16. The external thread on said sleeve 18 engages the internal thread of the tube 40 which is rotatably located on the inside of the end housing 42 and is provided with a flange 44 at the end which protrudes to the outside of said end housing 42. By rotating said flange the space between the spring coils may be adjusted to the desired ratio of the indicator movement in relation to the scale calibration.

A crayon 46 or other marking device is located on the inside of the flanged end of said tube 40. A cap 48 covers said crayon when it is not in use.

The numerals 50 in the boxes 52 indicate either miles per inch, a term which is commonly used on road maps, or it may indicate the ratio of the map scale which is commonly used on navigational and aeronautical charts and also on foreign maps.

In actual use of the measuring instrument the wheel 22 is rotated until the indicator 24 lines up with the starting line 54. Then the wheel 22 is rolled over the surface which is to be measured. At the destination a reading is taken at the point where the indicator disc 24 stops, selecting the scale on the housing 10 which corresponds with the scale of the map. If the map does not indicate miles per inch, or if none of the scales on the housing correspond with the scale of the map or chart, the following procedure is taken. The indicator is lined up with the starting line 54, then the wheel is rolled over the scale on the map or chart. If for instance the distance of the scale on the map is 5 miles, the flange 44 of the tube 40 is rotated until the indicator 24 lines up with the nearest 5 of any of the scales on the housing 10. This scale is now identified as the one which corresponds with the scale of the map.

While a specific embodiment of an improved measuring instrument has been disclosed in the foregoing description, it will be undertsood that various modifications within the spirit of the invention may occur to those skilled in the art. Therefore, it is intended that no limitations be placed on the invention except as defined by the scope of the appended claims.

Having thus disclosed and described the invention, what is claimed as new is:

1. A measuring instrument including a tubular housing made of a translucent material, various scales longitudinally delineated on the surface of said housing, a shaft within the housing, a compression spring extending over the full length of the scales on the housing, loosely mounted on said shaft, an indicator movable along said scales, said indicator having a portion engaged in the space between the spring coils, means for preventing rotational movement of said indicator, a wheel for rolling over the surface to be measured secured to said shaft, and means for adjusting the space between the spring coils.

2. A measuring instrument consisting of a translucent tubular casing, various scales longitudinally delineated on the entire surface of said casing, a shaft rotatably within the casing, a compression spring loosely mounted on said shaft, a traction wheel secured to said shaft, an indicator movable along said scales, a lug on the inside of the indicator, said lug being shaped to freely engage the space between the spring coils, means for preventing rotational movement of said indicator, and an adjustable sleeve for compressing the spring on said shaft.

3. A measuring instrument consisting of a translucent tubular casing, various scales longitudinally delineated on the surface of said casing, a shaft rotatable within the casing, a compression spring loosely mounted on said shaft, a traction wheel secured to said shaft, an indicator movable along said scales, a lug on the inside of said indicator, said lug being shaped to engage the space between the spring coils, a sleeve with a flange which is impelled against the end coil of the spring, said sleeve being provided with an external thread, a tube being provided with an internal thread which engages the external thread of said sleeve, said tube being provided with a flange to facilitate manual rotational movement whereby the spacing of the spring coils can be adjusted to the desired scale ratio.

References Cited by the Examiner

UNITED STATES PATENTS

| | | | |
|---|---|---|---|
| 2,151,191 | 3/39 | Crane | 74—458 |
| 2,367,431 | 1/45 | Reece | 235—61 |
| 2,579,956 | 12/51 | Owen | 33—141 |
| 2,825,136 | 3/58 | May | 33—189 X |

FOREIGN PATENTS

| | | |
|---|---|---|
| 20,571 | 4/18 | France. |
| 464,911 | 1/14 | France. |
| 907,924 | 3/46 | France. |
| 264,948 | 12/47 | Switzerland. |

ROBERT B. HULL, *Primary Examiner.*

SAMUEL S. MATTHEWS, *Examiner.*